Jan. 18, 1927.

T. JACOBS 1,614,614

AUTOMOBILE POWER TRANSMISSION

Filed Dec. 22, 1925　　4 Sheets-Sheet 1

Inventor

Thomas Jacobs,

By

Attorney

Jan. 18, 1927.

T. JACOBS 1,614,614

AUTOMOBILE POWER TRANSMISSION

Filed Dec. 22, 1925   4 Sheets-Sheet 2

Inventor
Thomas Jacobs,
By
Attorney

Jan. 18, 1927. 1,614,614
T. JACOBS
AUTOMOBILE POWER TRANSMISSION
Filed Dec. 22, 1925   4 Sheets-Sheet 3
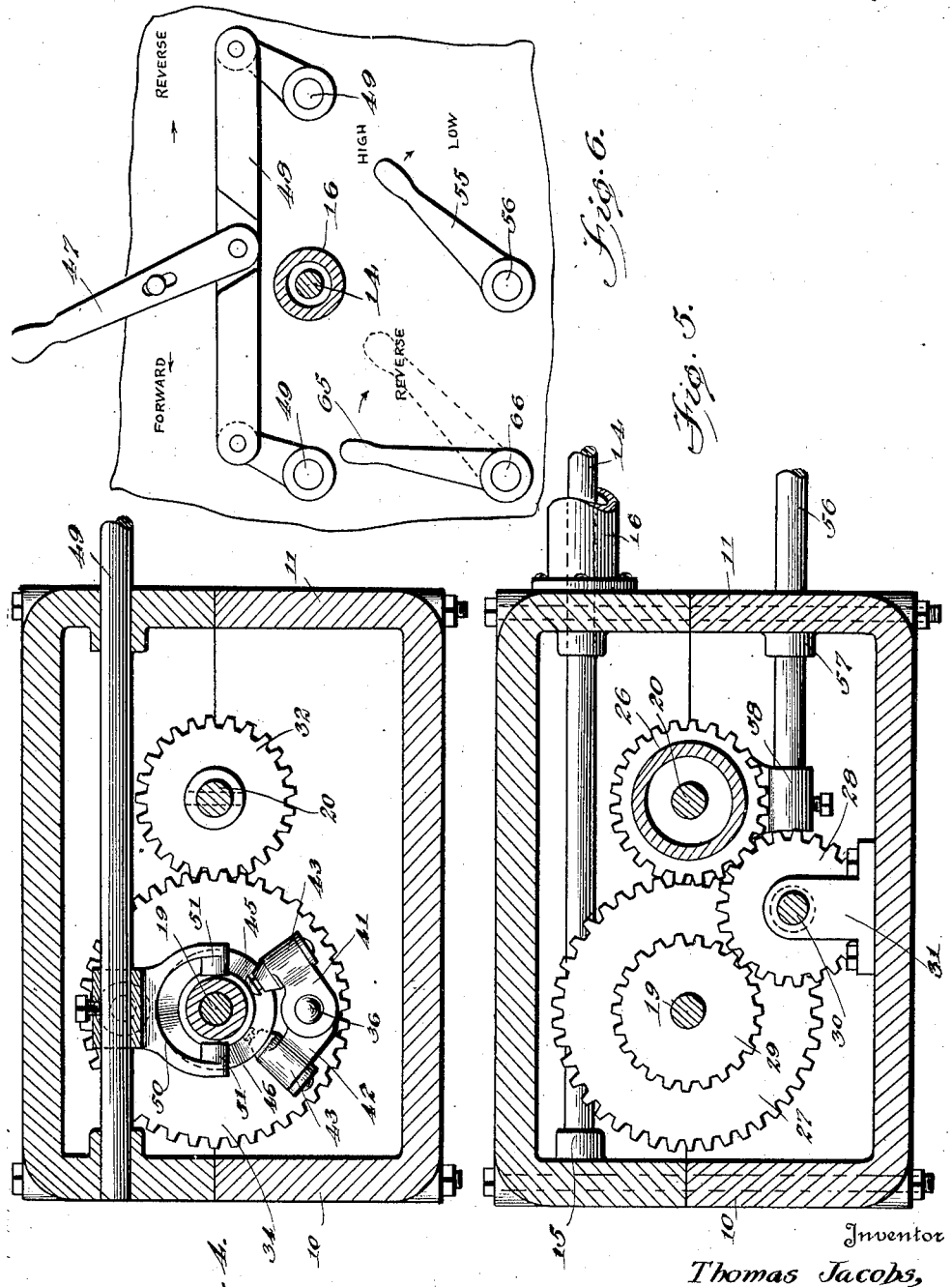
Inventor
Thomas Jacobs,
By
attorney Jan. 18, 1927.
T. JACOBS
1,614,614
AUTOMOBILE POWER TRANSMISSION
Filed Dec. 22, 1925    4 Sheets-Sheet 4
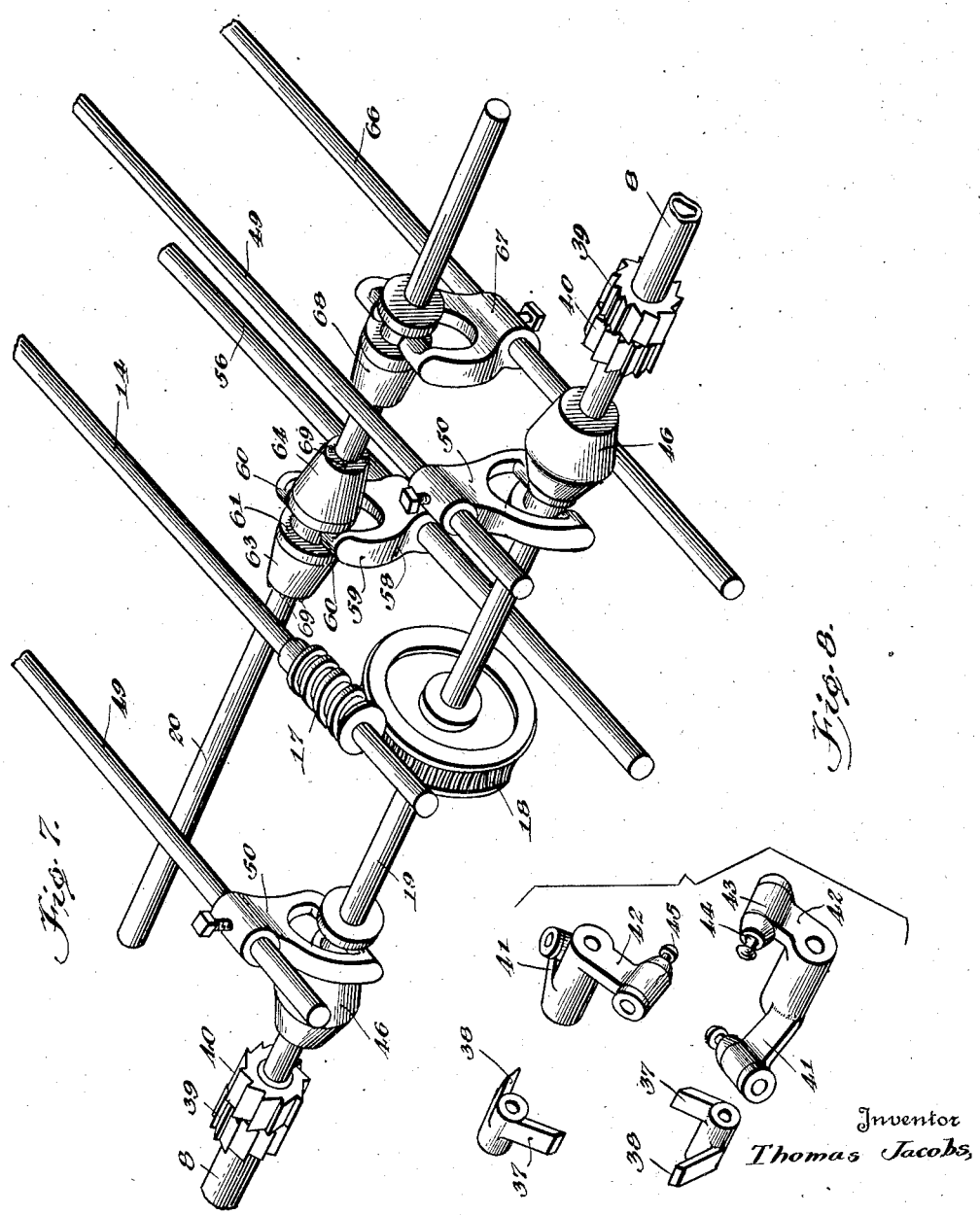
Inventor
Thomas Jacobs,
By
W. E. Beck, Jr.
Attorney Patented Jan. 18, 1927.

1,614,614

UNITED STATES PATENT OFFICE.

THOMAS JACOBS, OF EVANSVILLE, INDIANA.

AUTOMOBILE POWER TRANSMISSION.

Application filed December 22, 1925. Serial No. 77,014.

My invention relates to power transmission systems for automobiles and other motor driven vehicles.

An object of my invention is to provide a power transmission apparatus adapted for use in the operation of motor driven vehicles, having a selective speed changing mechanism arranged so as to effect a variation in speeds by a single movement of the control means.

Another object is to eliminate the necessity of the foot clutch as commonly used in automobiles and to provide a selective speed changing mechanism operable by a single control.

A further object is to mount the variable speed mechanism in association with the wheel driven axle, thereby dispensing with the usual transmission mechanism and substituting a pawl and ratchet axle driving construction in place of the common form of wheel differential.

A still further object is the provision of a separate reverse apparatus operable independently from the variable speed mechanism.

Other objects and advantages will become apparent from the following detailed description when viewed together with the accompanying drawings forming part hereof, in which—

Figure 1:
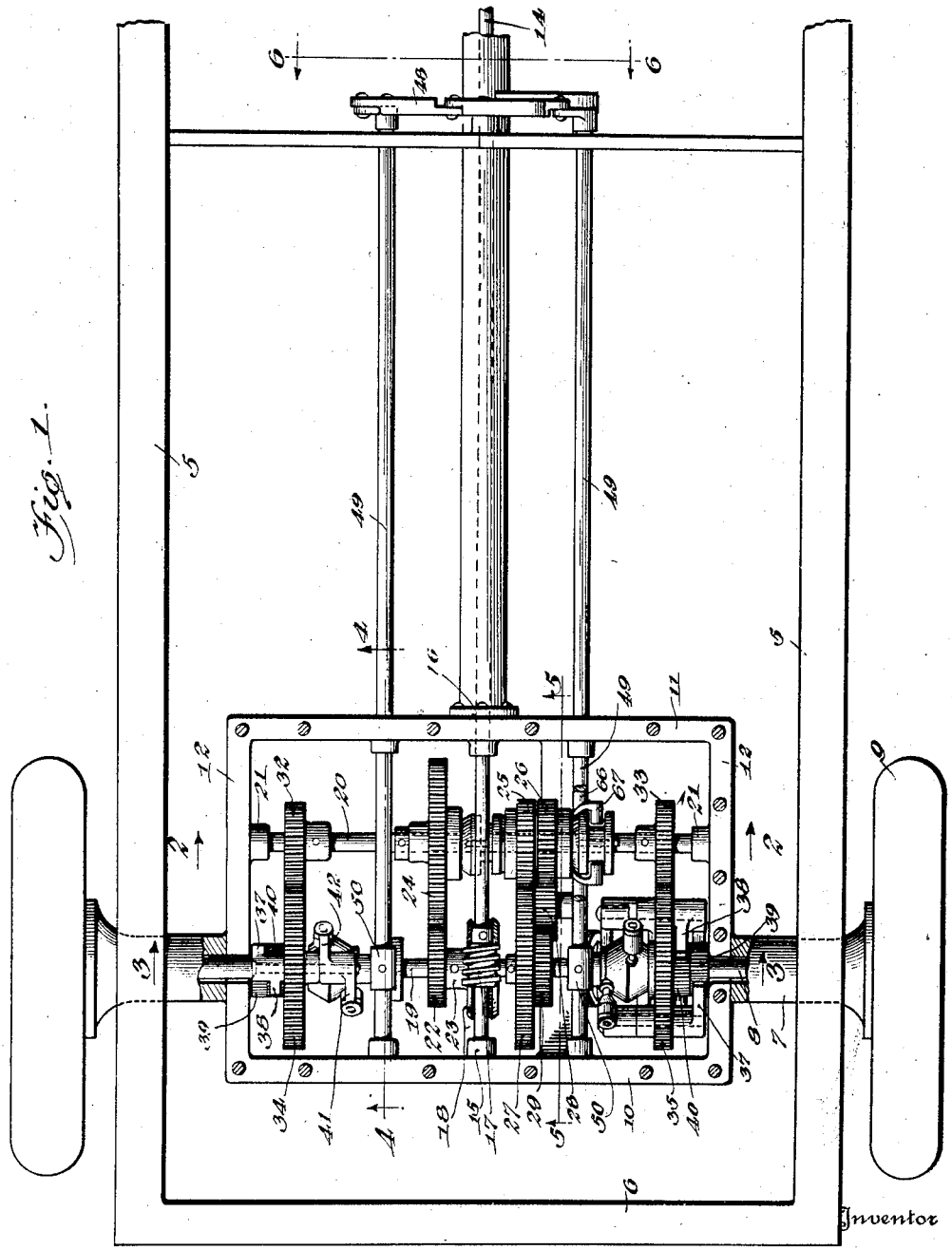
Figure 2:
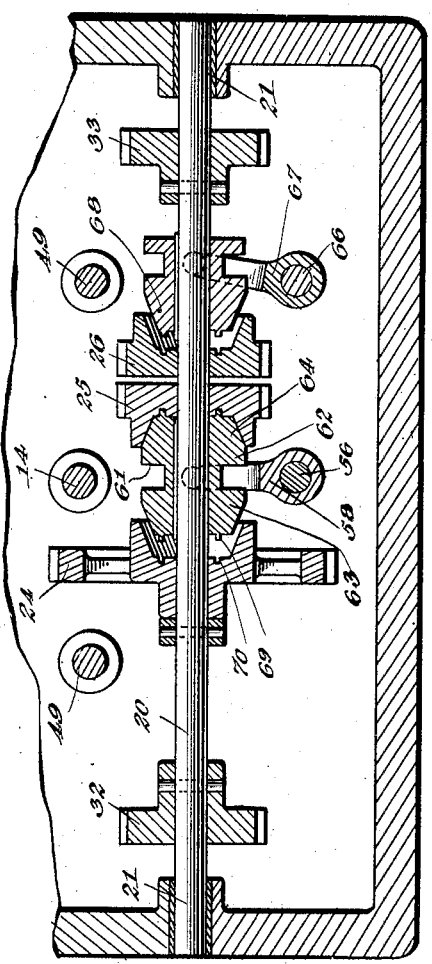
Figure 3:
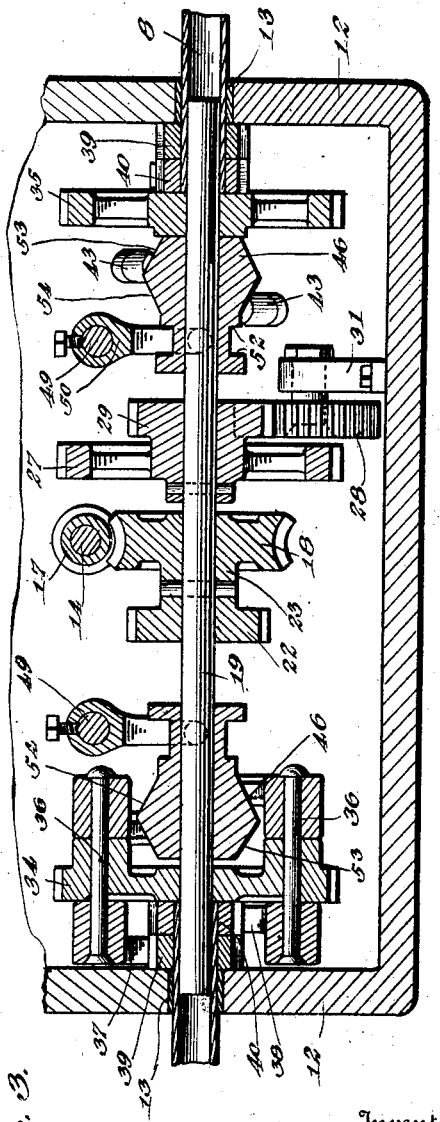

Figure 1 is a plan view showing the rear portion of a vehicle chassis upon which my invention is mounted, Figure 2 is a transverse sectional view taken on line 2—2 of Figure 1, Figure 3 is a similar view taken on a line 3—3 of Figure 1, Figure 4 is a sectional view taken on a line 4—4 of Figure 1, Figure 5 is a similar view taken on a line 5—5 of Figure 1, Figure 6 is a view taken on a line 6—6 of Figure 1, and showing the relative operating positions of the control levers, Figure 7 is a fragmentary perspective view showing the several clutch constructions, and Figure 8 is a similar view of the pawl releasing and engaging mechanism through which the forward and reverse movement of the vehicle is obtained.

Referring now to the drawings, for the purposes of illustration, I have shown in Figure 1 a vehicle chassis of any suitable type, having longitudinal frames 5 and a transverse rear frame 6 to which the same are connected. Near the rear end of the chassis and at each side thereof, is mounted a relatively short axle housing 7, within which is carried a short tubular axle 8, and a vehicle wheel 9 mounted on the outer end thereof.

A gear box is attached to the axle housing, having a transversely extending rear wall 10 and a transversely extending front wall 11 and longitudinal side walls 12 to the respective sides of which the said housings are secured.

Openings are provided in the side walls of the gear box through which the axles extend, being journalled in bushings 13 to insure a proper bearing for the rotation thereof. The tubular axles terminate shortly after the same enter the gear box and a shaft 19 is then provided having its ends rotatably carried within the hollow ends of the axles so that the axles and shaft rotate independently of each other.

A rotatable drive shaft 14, extends longitudinally of the chassis, midway between the side frame members 5, and is connected at its forward end to the power plant or engine (not shown). The opposite end of the shaft enters the gear box through an opening provided in the front wall thereof, and has its end supported in a bearing 15 formed in the rear wall of the gear box. A bearing 16 is also provided for the drive shaft in the front wall of the gear box. A drive pinion 17, preferably comprising a worm gear, is fixedly mounted on the drive shaft and is arranged to mesh with a gear wheel 18 fixedly mounted on the shaft 19. Thus the rotating movement of the longitudinally extending drive shaft is transmitted in a similar movement to the transversely extending axle shaft. However, it is well to observe at this point in the description, that the rotation of the axle shaft 19 does not impart any movement to the wheel mounted axles 8, since the ends of the former are merely loosely carried in the tubular ends of the latter.

A second transversely extending shaft 20, is also mounted in the gear box forward of the axle shaft 19, the ends thereof being journalled in bearings 21 secured to the side walls 12. A spur gear 22 also rotatably mounted on the axle shaft 19 and joined to the worm gear wheel 18 by means of a hub 23, is meshed with a co-acting spur gear 24, which is loosely mounted on the shaft 20. I also provide a pair of spur gear wheels 25 and 26 freely mounted on the shaft 20, the gear 25 being adapted to engage a gear 27 of a substantially increased diameter keyed to the axle shaft 19 and the gear 26 adapted to engage, through an idler gear 28, a gear 29 of a similar diameter and also keyed to said axle shaft. The idler gear is clearly shown in Figure 5 as carried on a shaft 30, journalled in a bearing which is provided in the support 31 and secured to the bottom of the gear box. The spur gears 27 and 29 are preferably keyed to each other.

At opposite ends of the shaft 20 and keyed thereon, I provide spur gears 32 and 33 which are arranged to co-act with gears of a substantially increased ratio 34 and 35 respectively, which are freely mounted on the axle shaft near the ends thereof.

Each of the spur gear wheels 34 and 35 have provided at opposite sides thereon, a pair of transversely extending shafts 36, which are journalled in bearings carried by the wheels and arranged parallel to the axle shaft 19. On the outwardly extending end of each of said shafts and keyed thereon I provide a sleeve having formed thereon a pair of pawls 37 and 38, the pawls 37 of each sleeve being arranged on the outer end thereof beyond the dogs 38 and having their teeth engaging edges oppositely disposed. On the inwardly extending ends of the axles 8 are keyed a pair of ratchet wheels 39 and 40, with their teeth oppositely inclined, the teeth of the ratchet 40 being inclined forwardly and adapted for engagement by the pawls 38 and the teeth of the ratchet 39 being inclined rearwardly and adapted for engagement by the pawls 37.

On the inwardly extending end of the shaft 36 and keyed thereon, I provide a sleeve having a pair of arms 41 and 42 extending at a sharp angle away from each other, the arm 41 being arranged on the end of the shaft slightly beyond the arm 42. The ends of each of said arms terminate in a substantially bottle-shaped member 43, having an opening for receiving a spring actuated plunger 44 slidably carried therein. A roller 45, or similar friction engaging member is mounted on the outer end of the plunger for frictional engagement with an adjacent rotating collar 46 freely mounted on the shaft 19.

Operating means for controlling the frictional engagement of the rollers 45 with their adjacent collar 46 is provided, comprising a lever 47 arranged in a convenient position for the operator, and to which is attached a link 48 connected to the ends of and for the purpose of simultaneously operating a pair of rods 49 extending longitudinally along opposite sides of the vehicle. Near the rear ends of said rods and keyed thereon, I provide a clutch mechanism comprising a downwardly extending yoke 50 having ends 51 turned in a direction toward each other and sufficiently spaced apart to be carried within an annular groove 52 provided on one side of the rotating collar 46. It will be noticed from Figure 3 that each rotating collar 46 is provided outwardly sloping surfaces 53 and inwardly sloping surfaces 54 and that the rollers 45 on the arms 41 engage the sloping portions 54 and the rollers on the arms 42 engage the sloping portions 53.

In arranging the sleeves on the shaft 36 it is necessary to assemble the same in a slightly different manner for use upon the right and left sides of the vehicle. In the construction necessary for use on the right side the arms 42 are arranged to extend in a direction parallel to the dogs 38 and the arms 41 extend parallel to the pawls 37 and since they are keyed on a common shaft any movement imparted to the arms by the collar 46 will result in a similar movement to the associated pawls.

In the construction for the left side of the vehicle a different assemblage is provided, the arms 41 being arranged in parallel relation with the pawls 38 and the arms 42 similarly arranged with respect to the pawls 37. Thus as the clutch is operated to move the collars toward the right side of the vehicle, the proper arms will be operated to disengage the dogs 38 of both the right and left side constructions and also to engage the pawls 37, and when the clutch is operated toward the left, the pawls 38 are then engaged and the pawls 37 disengaged.

This arrangement provides a simple and practical means for selectively operating the vehicle either forwardly or rearwardly. The propulsion of the vehicle is effected through the gear wheels 34 and 35, as will hereinafter more fully be explained, and which are freely mounted on the axle shaft 19. In order to impart the rotating force to the drive wheels and to operate the vehicle in a forward direction, the lever 47 is moved toward the right side thereof, which throws the clutch above described so as to cause the engagement of the dogs 37 with the ratchet wheels 39, which being keyed to the axles 8 forces the vehicle forwardly. In order to drive the vehicle rearwardly the lever is moved toward the left and the clutch then operates to engage the dogs 38 with the ratchet wheels 40 which, as before explained, are equipped for rearward movement.

In order to provide for a variation of speed in the operation of the vehicle, I employ a series of clutch mechanisms mounted on the shaft 20 and operable from a convenient position by the driver. I provide a conventional form of lever 55 keyed to a longitudinally extending rod 56 which extends within the gear box and supported in bearings 57. A clutch yoke 58 is keyed on the rod having arms 59 provided with ends 60 extending in a direction toward each other and adapted to fit within a groove 61 formed midway between the ends of a double faced clutch cone 62, which is keyed on the shaft 20. One side of the clutch cone 63 is arranged to seat within a dished hub of the gear wheel 24 and the opposite side 64 is arranged to seat within a similar dished hub in the gear wheel 25.

A second clutch mechanism is also provided and mounted on the shaft 20, comprising an operating lever 65, also conveniently arranged for the driver, keyed on a rod 66 which extends longitudinally of the vehicle and enters the gear box where it is supported in suitable bearings. A clutch yoke 67 is keyed on said rod, and constructed substantially similar to the yoke above mentioned, and arranged to operate a clutch cone 68 which is also keyed on the shaft 20 and adapted to seat within a dished hub carried by the gear wheel 26.

In order to prevent the various clutches from slipping after the same have been moved into engagement, I provide teeth 69, radially disposed on the inwardly extending face of the cone-shaped member and adapted to be received within recesses 70 radially disposed within the hub.

The transmission of the power from the engine to the drive wheels is accomplished in the following manner:

The drive 14 is connected directly to the crank shaft of the engine so that the R. P. M. of each is the same and no loss of power occurs between the engine and the speed changing mechanism. The power is taken from the drive shaft through the worm drive mechanism 17 and 18, the worm wheel 18 being keyed on the shaft 19. The small spur gear 22 is also keyed on the shaft 19 as is also the small spur gear 29 and the large spur gear 27 so that the rotation of each of these gears is continuous.

The small spur gear 22 being meshed with the large spur gear 24, which is loosely mounted on the shaft 20, causes a reduction in the rotation thereof. Therefore this combination constitutes the low speed mechanism, and when the vehicle is desired to be run at a slow speed the clutch 63 is moved into engagement with its co-acting wheel 24. Said clutch being keyed on the shaft 20 causes the rotation thereof which movement likewise causes the rotation of the gear wheels 32 and 33 which are also keyed on said shaft at each end thereof. The gear wheels 34 and 35 being enmeshed with the gears 32 and 33 respectively are thus operated and when the forward or reversing mechanism carried by the gear wheels 34 and 35 is thrown into operative position, as previously explained, the power is thereby applied to the drive wheels.

The speed of the vehicle may be increased by the operation of the following mechanism:

The large gear wheel 27 keyed on the shaft 19 is enmeshed with the smaller gear 25 loosely mounted on the shaft 20, the difference in gear ratio producing an increased rotation of the smaller gear. When this increased rotation is desired to be utilized, the clutch 64 which is keyed to the shaft 20 is moved into engagement with the gear 25, as a consequence of which the power is transmitted to the drive wheels as above explained. It will be noticed that the clutch 63, used for the operation of the vehicle at a low speed, and the clutch 64, used for the operation at a high speed, are formed integral and engageable from opposite directions, so that the engagement of one operates to disengage the other.

The spur gear 29 keyed on the shaft 19 is provided for reverse movement of the vehicle, this gear being used to drive the gear 26 through the idler gear 28 thereby reversing the direction of rotation of the gear 26 which is loosely mounted on the shaft 20. The clutch 68 keyed on the shaft 20 is employed to transmit such reverse motion to the drive wheels through the gears 32 and 33 and their co-acting gears 34 and 35 respectively.

Since the gears entering into the construction of the apparatus for driving the vehicle in a forward direction are independently operable from the gears employed for reversing the motion of the vehicle it is thus possible to use the reverse mechanism as an emergency braking means for quickly stopping the car.

The gear box should be constructed so as to retain a suitable quantity of gear lubricant so as to prevent undue wear of the parts through frictional engagement; and a cover plate provided to properly enclose the apparatus.

The gears provided in the construction of this invention may be made of sizes suitable to produce any desired speed for the vehicle.

While I have shown herein a preferred form of my invention it is obvious that the same is susceptible of various changes and modifications without departing from the spirit of the invention and the scope of the appended claims, and I accordingly claim as my own invention, all such changes to which I am entitled.

I claim:

1. A power transmission apparatus for vehicles, comprising a drive shaft connected directly to a source of power, a pair of wheel axles, a pair of shafts, one of which is rotatably carried by one end of each of said axles, a train of gears mounted on each of said shafts, a drive pinion secured to said drive shaft and arranged to operate said gears, ratchet wheels mounted on said wheel axles, a set of pawls carried on one of said gears and adapted for engagement with said ratchet wheels, and means for engaging and disengaging said pawls.

2. A power transmission apparatus for vehicles, comprising a drive shaft connected to a source of power, a pair of axles having wheels mounted on one end and their opposite ends of hollow construction, a pair of parallelly disposed shafts, one of said shafts having its ends rotatably carried in the hollow ends of said axle shafts, a train of gears freely mounted on the other of said shafts, a drive pinion secured to said drive shaft and arranged to operate said gears, ratchet wheels mounted on said wheel axles, a set of pawls carried on certain of said gears and adapted for engagement with said ratchet wheels, means for engaging said pawls, a clutch mechanism including a tapered engaging member keyed on one of said shafts and slidable transversely thereon and means for engaging said tapered member with one of said gears as and for the purposes set forth.

3. A power transmission apparatus for vehicles comprising a drive shaft connected to a source of power, a pair of wheel axles having wheels mounted on one end and their opposite ends of hollow construction, a pair of parallelly disposed shafts, one of said shafts having its ends rotatably carried in the hollow ends of said axle shafts and having a train of gears keyed thereon, a train of gears one of which is of increased diameter mounted on the other of said shafts, and co-acting with said first named gears, the intermediate of said last mentioned gears being freely mounted and the end gears keyed thereon, a drive pinion secured to said drive shaft and arranged to operate said gears, a clutch mechanism including a pair of tapered engaging members keyed on said last mentioned shaft and slidable transversely thereon, means for engaging said tapered members with adjacent gears including said gear of increased diameter, a plurality of pawls secured on certain of said gears mounted on the first named shaft, ratchet wheels mounted on said wheel axles and means for engaging said pawls with said ratchet wheels as and for the purposes set forth.

4. A power transmission apparatus for vehicles comprising a drive shaft connected to a source of power, a pair of wheel axles having wheels mounted on one end and their opposite ends of hollow construction, a pair of parallelly disposed shafts, one of said shafts having its ends rotatably carried in the hollow ends of said axle shafts and having a train of gears keyed thereon, a train of gears one of which is of increased diameter mounted on the other of said shafts, and co-acting with said first named gears, the intermediate of said last mentioned gears being freely mounted and the end gears keyed thereon, a drive pinion secured to said drive shaft and arranged to operate said gears, a clutch mechanism including a pair of tapered engaging members keyed on said last mentioned shaft and slidable transversely thereon, means for engaging said tapered members with adjacent gears including said gear of increased diameter, a plurality of pawls secured on certain of said gears mounted on the first named shaft, ratchet wheels mounted on said wheel axles, means for engaging said pawls with said ratchet wheels including a clutch operated collar having its periphery formed with sloping faces and slidable transversely on said first mentioned shaft, a plurality of sets of rollers mounted on the gears carrying said pawls, said rollers and said dogs being operatively connected and means for engaging said sloping faces of the collar with said rollers as and for the purposes set forth.

5. A power transmission apparatus for vehicles comprising a drive shaft connected to a source of power, a pair of wheel axles having wheels mounted on one end and their opposite ends of hollow construction, a pair of parallelly disposed shafts, one of said shafts having its ends rotatably carried in the hollow ends of said axle shafts and having a train of gears keyed thereon, a train of gears one of which is of increased diameter mounted on the other of said shafts, and co-acting with said first named gears, the intermediate of said last mentioned gears being freely mounted and the end gears keyed thereon, a drive pinion secured to said drive shaft and arranged to operate said gears, a clutch mechanism including a pair of tapered engaging members keyed on said last mentioned shaft and slidable transversely thereon, means for engaging said tapered members with adjacent gears including said gear of increased diameter, a shaft eccentrically arranged on certain of said gears mounted on the first named shaft having one end provided with a pair of pawls and the opposite end provided with a pair of arms, rollers secured to said arms, a clutch collar having its periphery formed of sloping faces engageable with said rollers and slidable transversely along the shaft carrying said gears, a pair of ratchet wheels mounted on said wheel axles having their teeth oppositely inclined and adapted to have said pawls co-act therewith, and a control for operating said clutch collar so that the engagement of certain of said rollers with a certain face thereof will engage certain of said pawls with one of said ratchet wheels and disengage the other of said pawls from the other of said ratchet wheels.

6. A power transmission apparatus for vehicles comprising a drive shaft connected to a source of power, a pair of wheel axles having wheels mounted on one end and their opposite ends of hollow construction, a pair of parallelly disposed shafts, one of said shafts having its ends rotatably carried in the hollow ends of said axle shafts and having a train of gears keyed thereon, a train of gears mounted on the other of said shafts including a gear of increased diameter and co-acting with said first named gears, the intermediate of said last mentioned gears being freely mounted and the end gears keyed on the shaft, a drive pinion secured to said drive shaft and arranged to operate said gears, a plurality of clutch mechanisms keyed on said last mentioned shaft and slidable transversely thereon and including a double-acting, cone-type clutch engaging member and a single cone-type clutch engaging member and adapted to engage clutch seats carried on adjacent gears including said gear of increased diameter, an idler gear placed in communication with the gear which co-acts with the single clutch engaging member, separate control levers for operating each of said clutch mechanisms, a shaft eccentrically arranged on certain of said gears mounted on the first named shaft having one end provided with a pair of pawls and the opposite end provided with a pair of arms, rollers secured to said arms, a clutch collar having its periphery fromed of sloping faces engageable with said rollers and slidable transversely along the shaft carrying said gears, a pair of ratchet wheels mounted on said wheel axles having their teeth oppositely inclined and adapted to have said pawls co-act therewith, and a control for operating said clutch collar so that the engagement of certain of said rollers with a certain face thereof will engage certain of said pawls with one of said ratchet wheels and disengage the other of said pawls from the other of said ratchet wheels.

In testimony whereof I affix my signature.

THOMAS JACOBS.